Dec. 17, 1963    R. L. FARROW ETAL    3,114,570
VEHICLE FOLDING SEAT STRUCTURE
Filed Oct. 8, 1959    2 Sheets-Sheet 1
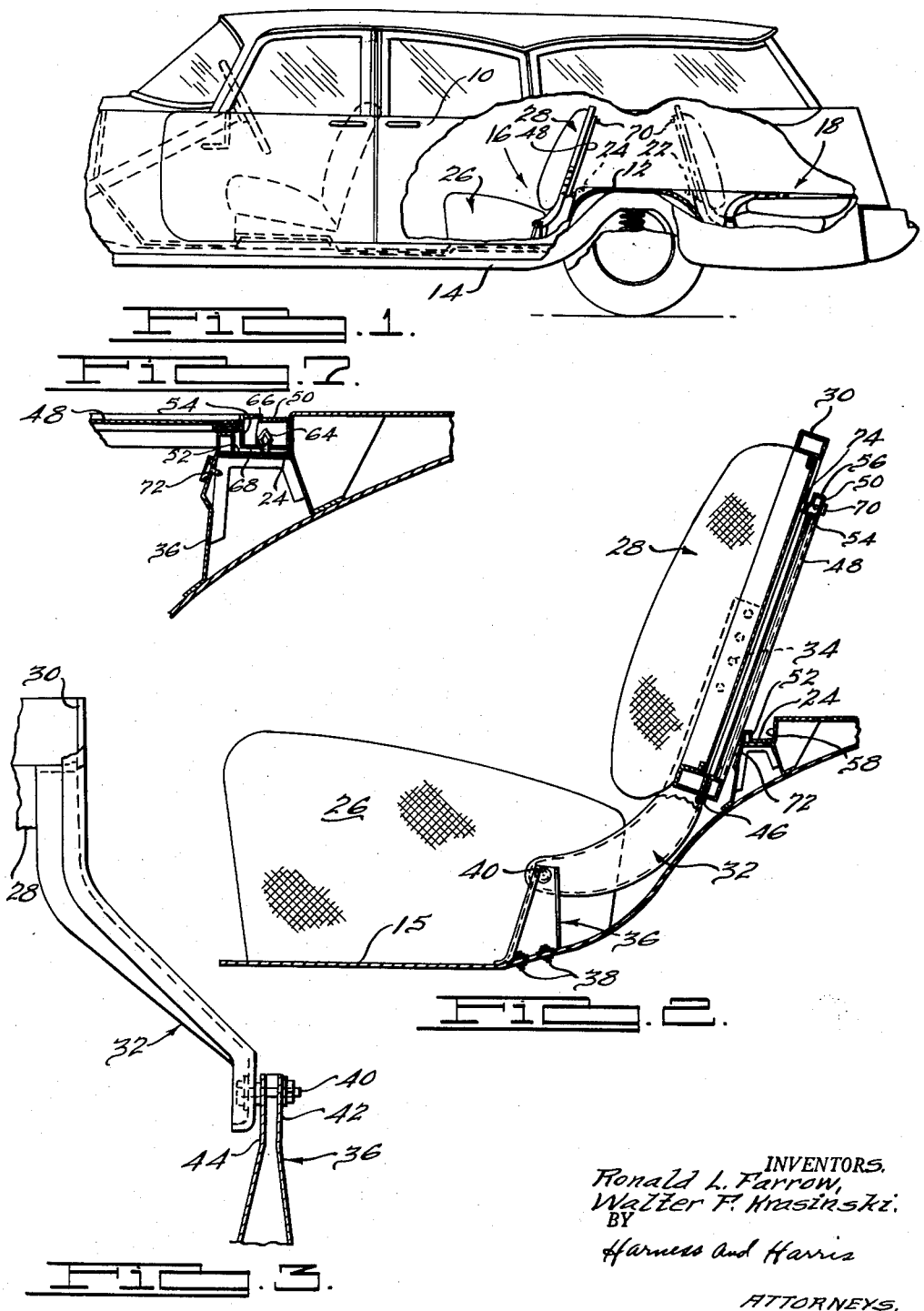
INVENTORS.
Ronald L. Farrow,
Walter F. Krasinski.
BY
Harness and Harris
ATTORNEYS.

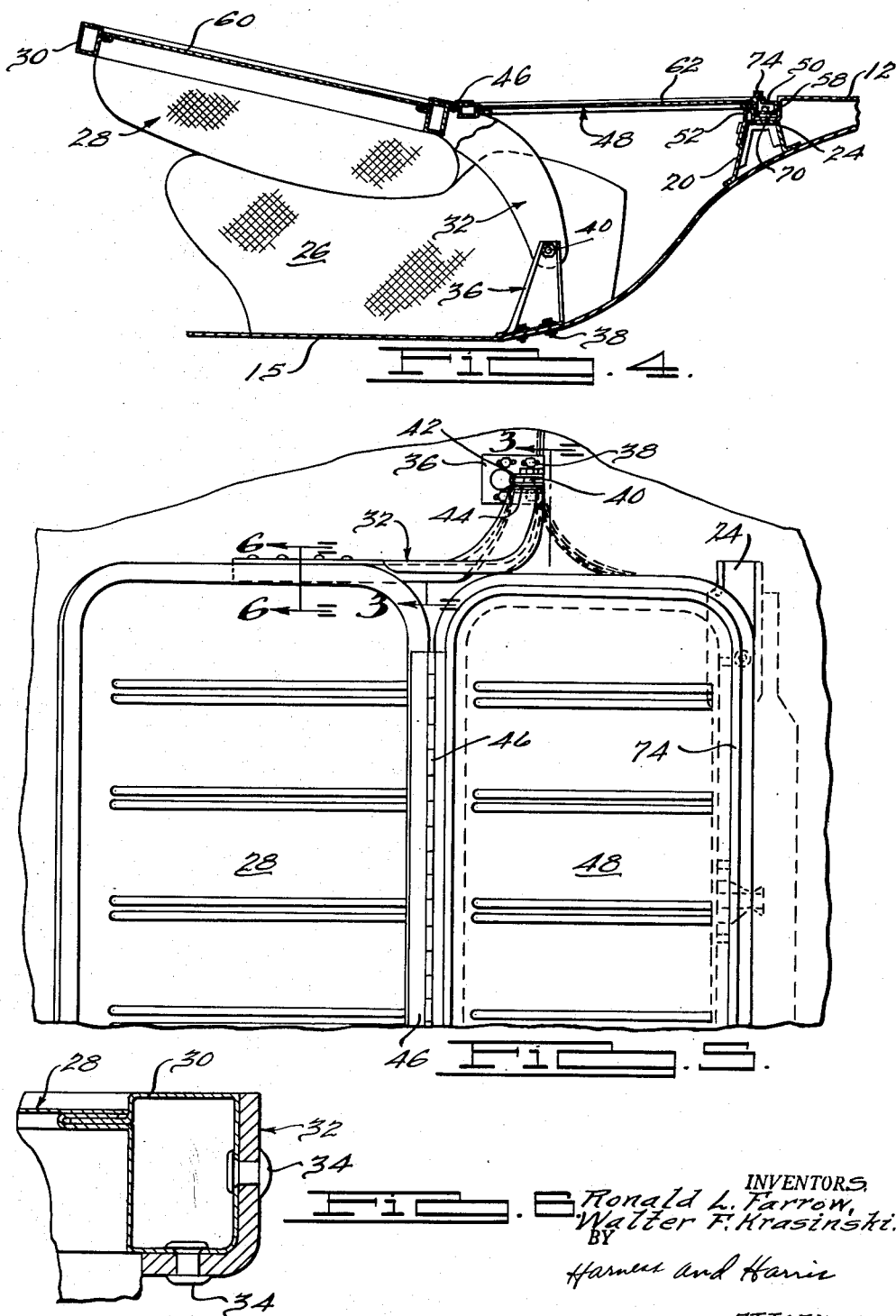

United States Patent Office 3,114,570
Patented Dec. 17, 1963

3,114,570
VEHICLE FOLDING SEAT STRUCTURE
Ronald L. Farrow, St. Clair Shores, and Walter F. Krasinski, Detroit, Mich., assignors to Chrysler Corporation, Highland Park, Mich., a corporation of Delaware
Filed Oct. 8, 1959, Ser. No. 845,152
5 Claims. (Cl. 296—66)

This invention relates to improvements in seating structure and in particular to a Suburban-type vehicle folding seat which is provided with a hatch means to complete the flooring of the vehicle as the back section of the seat is pivoted downwardly to the general plane of the flooring.

Heretofore various types of seating arrangements have been devised to convert the seats into floor sections of the Suburban, but these arrangements have not presented the most simple and most easy to manage convertible seat structure. Moreover, some of these convertible seat arrangements have been provided with additional supporting and mounting structure all of which increases the cost of the seat and increases the complexity of the seat structure and its manner of manipulation.

It is a principal object, therefore, of this invention to provide a vehicle seat which is convertible into a section of the flooring of a vehicle and which utilizes no additional supports or other mountings than provided on the conventional pivotally mounted back section of a vehicle seating structure.

A specific object of this invention is to provide a pivotally mounted back rest with a hatch means pivotally mounted on the back rest and adapted to become a section of the flooring of the vehicle as the back rest is itself moved from an upright position to a position wherein it also becomes a section of the vehicle flooring.

A further specific object is to provide this back rest and hatch means with means for maintaining the back rest and the associated hatch means in horizontal compression when they are in their floor positions.

A further object of this invention is to provide means for latching the hatch means in position when it forms a floor section.

Other objects and advantages of the present invention will become apparent from the following description and drawings in which:

FIGURE 1 represents a partially broken away side view of a Suburban vehicle having a second seat embodying this invention;

FIGURE 2 represents an enlarged side view of the seating unit embodying the present invention;

FIGURE 3 represents a view of the back rest mounting structure taken along the line 3—3 of FIGURE 5 in the direction of the arrows;

FIGURE 4 represents a cross-sectional view of the convertible seating arrangement shown in its floor position;

FIGURE 5 represents a top view of the structure of FIGURE 4;

FIGURE 6 represents a view of FIGURE 5 taken along the line 6—6 thereof in the direction of the arrows; and FIGURE 7 represents a cross-sectional view of a modification of the hatch retaining means.

Referring to the drawings, FIGURE 1 shows a Suburban body 10 having a stationary floor section 12 secured to the vehicle frame 14 with the floor section 12 separating two convertible seats 16 and 18. Seats 16 and 18 may be substantially identical and reversed in direction, seat 18 being termed the rearwardly facing seat. It is noted, however, that seat 18 could also be faced in a forward direction if desired.

Section 12 of the flooring as shown in FIGURE 4 is supported at its forward portion by an inverted channel-shaped support 20 and at its rearward end by an inverted channel-shaped support 22 as shown in FIGURE 1. Floor section 12 is provided at either end with an upwardly opening channel-shaped portion 24 extending transversely of the vehicle for a purpose to be described below.

Seats 16 and 18 being substantially identical may be conveniently described with reference to only seat 16 which comprises a seat cushion 26 and a back rest 28. Seat 26 may be stationarily secured by any suitable means to the floor section 15 of the vehicle body 10. Back rest 28 is provided with a suitable frame 30 substantially encircling the edges thereof and a leg 32 is secured at each end of the frame 30 by any suitable means, such as sheet metal screws or rivets 34. Each of these legs 32 is pivotally mounted to a bracket 36 secured to floor 15 of the vehicle body by bolt means 38. A bolt 40 extending between the legs 42 and 44 of the bifurcated brackets 36 and also extending through the legs 32 of the back rest 28 provide the pivotal mounting for these legs. Legs 32 may be channel-shaped for additional strength.

Attached to the lower side of back rest frame 30 by hinge means 46 is a panel-type hatch member 48 which can readily pivot clockwise as back rest 28 is pivoted counterclockwise from an upright position into the floor forming compressive position with respect to seat cushion 26 as shown in FIGURE 4. As the back rest 28 is forcibly compressed into the resilient seat cushion 26, the trailing edge or free swinging edge 50 of hatch 48 will come to rest in the upwardly opening, floor supporting channel 24. Further downward movement of back rest 28 into the resilient seat 26 will be prevented by the abutment of the lip 52 of channel 24 and lip 54 of the trailing edge 50 of the hatch 48. As seat 26 urges back rest 28 upwardly in a clockwise rotative movement about its pivot 40 the outer edge 56 of the hatch member will abut the edge 58 of channel 24 to prevent further upward motion of back rest 28. With the hatch 48 thus in compression normal vehicle vibration will not dislodge it from channel 24 and the floor surface 60 of back rest 28 and floor surface 62 of hatch 48 will be maintained in substantially the position shown in FIGURE 4. It is particularly noted that should it be desired to make the surfaces 60 and 62 lie exactly in the same horizontal plane, this may readily be accomplished by increasing the length of section 62 and/or adjusting the relative thickness of seat cushion 26 and back rest 28.

Should it be found desirable to provide a positive locking means to prevent the hatch 48 from moving upwardly in response to vehicle vibration, a spring type of catch 64 as shown in FIGURE 7 may be provided on the bottom of channel 24 and an aperture 66 for receiving the same may be provided in the bottom of the trailing edge 50 of the hatch 48. As the trailing edge 50 is pushed down over the catch 64, the catch will compress and thereafter expand outwardly as the bottom edge 68 of edge 50 moves into its most downward position. A plurality of rubber cushioners 70 may be provided on the bottom portion 68 of the rail 50 of the hatch 48 to cushion the same against noise while it is in channel 24. Similar rubber cushioners 72 and 74 may be provided on bracket 36 and edge 50 to cushion the hatch against noise when the back rest 28 is in its normal upright position.

We claim:

1. A vehicle body seat unit comprising relatively movable seat and backrest members with the backrest member mounted on said body for pivotal movement about a horizontal axis from an operative upright backrest position adjacent the rear side of the seat to a substantially horizontal position overlying and solely supported by said seat member, at least one of said seat and backrest members being resilient and being compressed when said members are in overlying relationship, hatch means pivotally mounted on said backrest at a substantial vertical distance from the pivot of said backrest and adapted to pivot about a horizontal axis in an opposite direction to said backrest as said backrest is pivoted to said overlying position, and channel-shaped retaining means formed as an integral part of the vehicle body adapted to abuttingly receive an offset on the free-swinging edge portion of said hatch means to compressively maintain said hatch means and said backrest in substantially a common horizontal plane, said hatch means being of such a width and so positioned on said backrest that it is compressively engaged between its pivotal mounting on the backrest and said channel-shaped retaining means when the hatch means and backrest are arranged in a substantially common horizontal plane.

2. A vehicle body seat unit comprising relatively movable seat and backrest members with the backrest member mounted on said body for pivotal movement about a horizontal axis from an operative upright backrest position adjacent the rear side of the seat to a substantially horizontal position overlying and solely supported by said seat member, at least one of said seat and backrest members being resilient and being compressed when said members are in overlying relationship, hatch means pivotally mounted on said backrest at a substantial vertical distance from the pivot of said backrest and adapted to pivot about a horizontal axis in an opposite direction to said backrest as said backrest is pivoted to said overlying position, and channel-shaped retaining means formed as an integral part of the vehicle body adapted to abuttingly receive an offset on the free-swinging edge portion of said hatch means to compressively maintain said hatch means and said backrest in substantially a common horizontal plane, said hatch means being of such a width and so positioned on said backrest that it extends between and compressively reacts against its pivotal mounting on the backrest and said channel-shaped retaining means when the hatch means and backrest are arranged in a substantially common horizontal plane.

3. In a vehicle body seat unit as set forth in claim 2 wherein noise damping means is included in the channel-shaped retaining means that receives the free swinging edge portion of the hatch means.

4. In a vehicle body seat unit as set forth in claim 2 wherein latch means is included in the channel-shaped retaining means that receives the free swinging edge portion of the hatch means.

5. In a vehicle body having a loading platform therein and a foldable seat unit mounted in front of and adjacent to an edge of said loading platform, said foldable seat unit comprising a seat back panel, a resilient seat cushion mounted on said vehicle body below said loading platform, a resilient seat back cushion mounted on said seat back panel, means pivotally mounting said seat back panel on said vehicle body for pivotal movement from an upright seat-forming position to a substantially horizontal position overlying and solely supported by said resilient seat cushion wherein said resilient cushions are compressed, said seat back panel being adapted to overtravel beyond said horizontal position to further compress said resilient cushions, a movable panel pivotally connected to and having a free edge thereof movable away from said seat back panel, said movable panel being adapted to form a bridging floor between and in alignment with said loading platform and said seat back panel when said seat back panel is pivoted to said horizontal position, a supporting and latching means on said adjacent edge of said loading platform adapted to support and latch said free edge of said movable panel, said latching means coacting with said free edge to hold said seat back panel in said horizontal position by the resultant rearward force on said movable panel caused by compression of said resilient cushions.

References Cited in the file of this patent
UNITED STATES PATENTS

| | | |
|---|---|---|
| 1,156,408 | Kiehler | Oct. 12, 1915 |
| 1,675,685 | Andrade | July 3, 1928 |
| 2,602,691 | Doty | July 8, 1952 |
| 2,916,325 | Estes et al. | Dec. 8, 1959 |
| 2,926,948 | Koplin et al. | Mar. 1, 1960 |
| 2,926,950 | Hooverson | Mar. 1, 1960 |
| 2,926,951 | Koplin | Mar. 1, 1960 |
| 2,927,818 | Ferrara | Mar. 8, 1960 |
| 3,008,755 | Hale | Nov. 14, 1961 |

FOREIGN PATENTS

| | | |
|---|---|---|
| 106,977 | Australia | Mar. 30, 1939 |
| 928,506 | Germany | June 2, 1955 |